(12) United States Patent
Kawai

(10) Patent No.: US 7,566,673 B2
(45) Date of Patent: Jul. 28, 2009

(54) GLASS SUBSTRATE FOR AN INFORMATION RECORDING MEDIUM AND INFORMATION RECORDING MEDIUM EMPLOYING IT

(75) Inventor: Hideki Kawai, Kobe (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 845 days.

(21) Appl. No.: 10/784,447

(22) Filed: Feb. 23, 2004

(65) Prior Publication Data

US 2005/0096210 A1 May 5, 2005

(30) Foreign Application Priority Data

Oct. 31, 2003 (JP) ............................. 2003-371514

(51) Int. Cl.
*C03C 3/093* (2006.01)
*C03C 3/085* (2006.01)

(52) U.S. Cl. ............................. 501/69; 501/67; 501/68; 501/70; 428/64.1; 428/64.2; 428/64.4; 428/410; 428/846.9

(58) Field of Classification Search .................. 501/66, 501/67, 68, 69, 70; 428/64.1, 64.2, 64.4, 428/410, 426, 846.9
See application file for complete search history.

(56) References Cited

U.S. PATENT DOCUMENTS

| | | | | |
|---|---|---|---|---|
| 3,790,430 A | * | 2/1974 | Mochel | 428/410 |
| 5,476,821 A | | 12/1995 | Beall et al. | 501/10 |
| 5,674,790 A | * | 10/1997 | Araujo | 501/66 |
| 5,691,256 A | * | 11/1997 | Taguchi et al. | 501/63 |
| 5,780,371 A | * | 7/1998 | Rifqi et al. | 501/67 |
| 5,874,376 A | * | 2/1999 | Taguchi et al. | 501/63 |
| 6,114,039 A | * | 9/2000 | Rifqi | 428/410 |
| 6,303,528 B1 | * | 10/2001 | Speit et al. | 501/69 |
| 6,312,841 B1 | | 11/2001 | Watanabe et al. | 348/222.1 |
| 6,518,211 B1 | * | 2/2003 | Bradshaw et al. | 501/69 |
| 6,818,576 B2 | * | 11/2004 | Ikenishi et al. | 501/65 |
| 7,040,953 B2 | * | 5/2006 | Matsuno et al. | 451/5 |
| 7,197,897 B2 | * | 4/2007 | Jacobson et al. | 65/30.14 |
| 2001/0014573 A1 | | 8/2001 | Shimoi et al. | 451/41 |
| 2003/0232169 A1 | * | 12/2003 | Kawai | 428/66.6 |
| 2004/0063564 A1 | * | 4/2004 | Kawai et al. | 501/68 |
| 2004/0242398 A1 | * | 12/2004 | Mori et al. | 501/68 |
| 2005/0215414 A1 | * | 9/2005 | Kawai | 501/69 |

FOREIGN PATENT DOCUMENTS

| | | |
|---|---|---|
| EP | 0 917 135 B1 | 8/2006 |
| JP | 2000-076652 A | 3/2000 |
| JP | 2000-082211 A | 3/2000 |
| JP | 2000-207730 A | 7/2000 |
| WO | WO 98/05593 A1 | 12/1998 |

OTHER PUBLICATIONS

Chinese "The First Office Action", dated Jul. 27, 2007, for counterpart Chinese Patent Application No. 200480032531.3; Together with an English-translation of the text of the First Office Action.
"Japanese" Search Report and "Japanese" Written Opinion, having a mailing date of Nov. 22, 2004, concerning international application No. PCT/US2004/014955, along with English translations thereof.
Singapore "Invitation to Respond to Written Opinion" with Australian "Written Opinion", having a mailing date of Apr. 9, 2007, concerning Singapore Patent Application No. 2006022585-2.

* cited by examiner

*Primary Examiner*—Karl E Group
*Assistant Examiner*—Elizabeth A Bolden
(74) *Attorney, Agent, or Firm*—Sidley Austin LLP

(57) ABSTRACT

A chemically strengthened glass substrate for use as the substrate of an information recording medium such as a magnetic disk, magneto-optical disk, DVD, or MD, wherein a strengthened formed by chemical strengthening exists on the outer edge surface and on the inner edge surface but substantially not on a surface on which an information recording layer is formed.

15 Claims, 3 Drawing Sheets

$$C = \{(L_1 + L_2) / 2\} / 2$$

GLASS SUBSTRATE FOR AN INFORMATION RECORDING MEDIUM AND INFORMATION RECORDING MEDIUM EMPLOYING IT

This application is based on Japanese Patent Application No. 2003-371514 filed on Oct. 31, 2003, the contents of which are hereby incorporated by reference.

BACKGROUND OF THE INVENTION

1. Field of the Invention

The present invention relates to a glass substrate for an information recording medium (hereinafter also referred to simply as "a glass substrate"), and more particularly to a glass substrate for use as a substrate of an information recording medium such as a magnetic disk, magneto-optical disk, DVD, or MD.

2. Description of the Prior Art

Conventionally, magnetic disks for use in stationary devices such as desk-top computers and servers typically have substrates made of aluminum alloy, and those for use in portable devices such as notebook computers and mobile computers typically have substrates made of glass. However, aluminum alloy is prone to deformation, and is not hard enough to offer satisfactory surface smoothness on the surfaces of a substrate after polishing. Moreover, when a head makes mechanical contact with a magnetic disk, the magnetic film is liable to exfoliate from the substrate. For these reasons, substrates made of glass, which offer satisfactory surface smoothness and high mechanical strength, are expected to be increasingly used in the future not only in portable devices but also in stationary devices and other home-use information devices.

One known type of glass substrate is those made of chemically strengthened glass, in which the alkali elements present near the surface of the substrate are replaced with other alkali elements in order to produce compression strain and thereby increase mechanical strength. In the manufacture of chemically strengthened glass, the process of chemical strengthening is typically performed after the process of polishing, and glass substrates that have undergone the chemical strengthening process are shipped intact as an end product without being subjected to any further process. This necessitates subjecting the glass substrates to polishing that attains flatness higher than is eventually required in order to allow for the normally unavoidable degradation of the their flatness as a result of the chemical process. Moreover, if the glass substrates develop deformation as a result of the chemical process, there is no choice but to discard them as defective. This makes it difficult to achieve a sufficiently high yield rate. To overcome these inconveniences, for example, Japanese Patent Application Laid-Open No. 2000-76652 proposes a technique of subjecting glass substrates first to a chemical strengthening process and then to a polishing process with a view to improving productivity and associated results.

However, according to the technique proposed in the publication mentioned above, although the strengthened layer on the main surface is removed by polishing in the polishing process performed after the chemical strengthening process, a predetermined thickness of the strengthened layer is left even after the polishing process. Thus, if the strengthened layer left after the polishing process is uneven, it degrades geometrical quality such as flatness. To prevent this, the top and bottom surfaces of glass substrates need to be polished uniformly, and this requires a high-precision polishing technique.

SUMMARY OF THE INVENTION

An object of the present invention is to provide a glass substrate for an information recording medium which excels in geometrical accuracy such as flatness without requiring a high-precision polishing technique and which has high strength.

Another object of the present invention is to provide a glass substrate for an information recording medium which excels in mechanical strength and durability and which permits high-density recording.

To achieve the above objects, according to one aspect of the present invention, in a chemically strengthened glass substrate for an information recording medium, a strengthened layer formed by chemical strengthening exists on the outer edge surface and on the inner edge surface but substantially not on a surface on which an information recording layer is formed (hereinafter, such a surface will be also referred to as a "recording surface"). It should be noted that, in the present specification, chemical strengthening denotes producing compression strain at the surface of a glass substrate by replacing the ions present near the glass surface with ions having larger ion radii in a temperature region lower than the glass transition temperature of the glass substrate.

With this structure, a glass substrate for an information recording medium according to the present invention has higher effective strength, and is thus less prone to destruction or damage starting at the outer or inner edge surface. Moreover, the glass substrate excels in resistance to impact, and is thus far less liable to break while being handled in the manufacturing and other processes. Even if the glass substrate breaks, it is unlikely to scatter so wide as to contaminate the process. Moreover, having substantially no strengthened layer on a surface on which an information recording layer is formed, the glass substrate has high flatness and smoothness on the surface. This helps achieve high-density recording when the glass substrate is formed into an information recording medium.

In the present specification, the fracture toughness Kc was determined using a Vickers hardness tester and according to the formula noted below on the basis of the pressure mark produced with a Vickers indenter under the following conditions: with a load of 500 g, and with loading duration of 15 seconds (see FIG. 3).

$$Kc=0.018(E/Hv)^{1/2}(P/C^{3/2})=0.026E^{1/2}P^{1/2}a/C^{3/2}$$

where Kc represents the fracture toughness ($Pa \cdot m^{1/2}$), E represents the elastic modulus (Pa), Hv represents the Vickers hardness (Pa), P represents the pressing load (N), C represents half the average of the lengths of cracks (m), and "a" represents half the average of the lengths of the diagonals of the pressure mark (m).

The Si elution S and alkali elution A were determined by first producing a 2.5-inch disk by polishing the recording surface of the strengthened glass substrate, then immersing the disk in 50 ml of reverse osmosis membrane water at 80° C. for 24 hours, and then analyzing the elution liquid with an ICP emission spectrochemical analyzer. Thus, the alkali elution here is the total elution of Li, Na, and K. The specific elastic modulus ($E/\rho$) equals the Young's modulus E divided by the specific gravity $\rho$. The Young's modulus E was measured by the method for testing dynamic modulus of elasticity included in the methods for testing elasticity of fine ceramics defined in JIS (Japanese Industrial Standards) R 1602, and the specific gravity $\rho$ was measured in distilled water at 25° C. by a method based on Archimedes' principle. The Vickers hardness Hv was measured using a Vickers hardness tester under the following conditions: with a load of 100 g, and with loading duration of 15 seconds.

According to another aspect of the present invention, an information recording medium has a glass substrate structured as described above, and has an information recording layer formed thereon. With this structure, it is possible to make breakage during the manufacturing process less likely, and thereby increase the yield rate. Moreover, it is possible to increase the durability and reliability of the recording medium.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
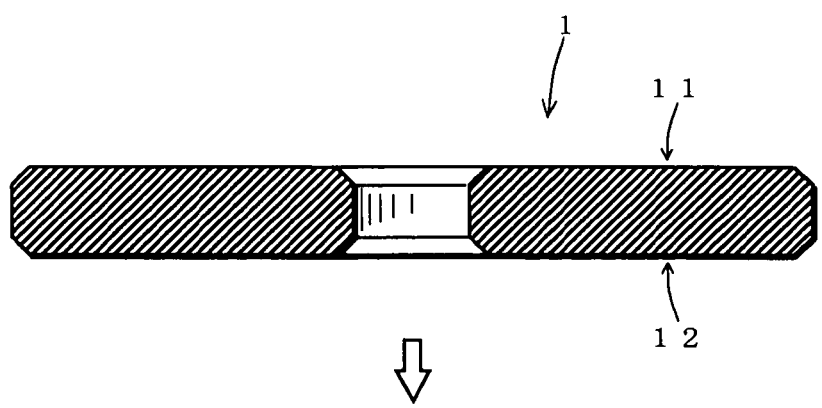
FIGS. 1A, 1B, and 1C are diagrams showing an example of the manufacturing process of a glass substrate according to the invention.

The inventor of the present invention noticed that destruction or breakage of a glass substrate typically starts at the inner or outer edge surface thereof, and, through an intensive study, has found that, by forming a strengthened layer by chemical strengthening on the inner and outer edge surfaces of a glass substrate but not on the top and bottom surfaces, i.e., recording surfaces, thereof, it is possible to effectively prevent destruction of or damage to the glass substrate and to minimize the degradation of the geometrical accuracy, such as flatness, of the glass substrate that tends to result from chemical strengthening. These findings have led the inventor to conceive the present invention.

Specifically, a strengthened layer is formed on the inner and outer edge surfaces of a glass substrate, where destruction of or damage to the glass substrate tends to start. This helps increase the strength of the glass substrate. On the other hand, no strengthened layer is formed on a recording surface. This helps minimize the change in the shape of the glass substrate that is caused by the strain in the strengthened layer.

In the present invention, chemical strengthening is achieved by immersing a glass substrate in nitrate melt heated to below the glass transition temperature. This causes the ions present near the glass surface to be replaced with ions having larger ion radii, and thereby causes compression strain to be produced at the glass surface, achieving strengthening. The melt for chemical strengthening is, for example, a molten salt of potassium nitrate, sodium nitrate, potassium carbonate, or the like, a molten salt of a mixture of one or more of those salts, or a molten salt of one or more of those salts mixed with a salt containing ions of Cu, Ag, Rb, Cs, or the like.

The thickness of the strengthened layer formed by the chemical process is adjusted by controlling the temperature to which the chemical strengthening melt is heated and the duration for which the glass substrate is immersed therein, as will be understood from the examples described later (see Table 2). The higher the temperature of the melt, and the longer the duration of immersion, the thicker the strengthened layer. For an optimal tradeoff between maximizing the strength of the glass substrate and minimizing the time required for its polishing, the thickness of the strengthened layer is preferably in the range of from 3 μm to 20 μm. The temperature to which to heat the chemical strengthening melt is determined appropriately in consideration of the glass transition temperature of the glass substrate, preferably in the range of from 280° C. to 660° C., and further preferably in the range of from 320° C. to 500° C. The immersion duration is preferably in the range of from 0.1 hours to several tens of hours.

To form a strengthened layer by chemical strengthening on the inner and outer edge surfaces of a glass substrate but not on the top and bottom surfaces, i.e., recording surfaces, thereof, first the glass substrate is immersed in chemical strengthening melt, and then the top and bottom surfaces thereof are polished to remove the strengthening layer on those surfaces; alternatively, first the top and bottom surfaces of the glass substrate are coated with a masking substance, and then the glass substrate is immersed in chemical strengthening melt with only the inner and outer edge surfaces thereof exposed. Between these two methods, for higher productivity, removal by polishing is recommended. Now, a description will be given of how the strengthening layer on the top and bottom surfaces is removed by polishing.

Figure 1B:
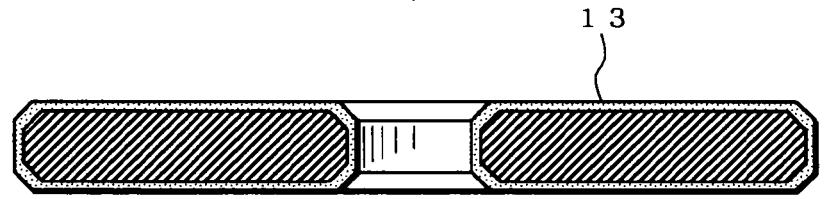
Figure 1C:
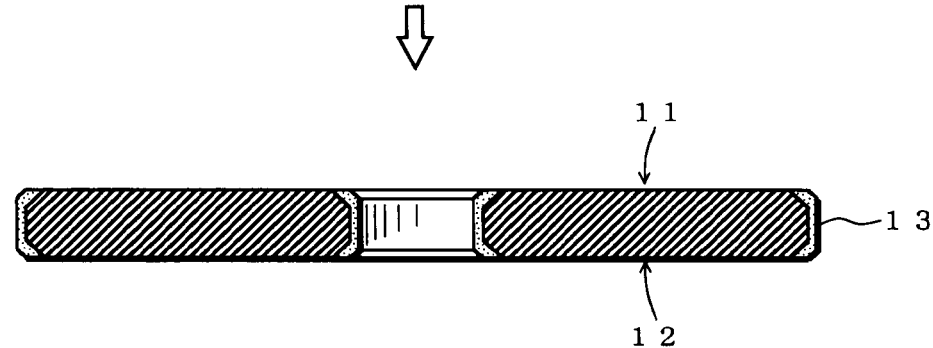

FIG. 1 is a diagram showing the manufacturing process of a glass substrate. A glass block is sliced into a disk having a predetermined thickness, and a glass substrate 1 is cut out of it using a cutter so as to have concentric inner and outer edges (FIG. 1A). Here, it is advisable to chamfer or round the inner and outer edges of the glass substrate 1. The glass substrate 1 shown in FIG. 1 is subjected to chamfering. Ultimately, an information recording layer 2 (shown in FIG. 2) will be formed on the top and bottom surfaces 11 and 12 of the glass substrate 1. Then, this glass substrate 1 is immersed for a predetermined duration in nitrate melt heated to a predetermined temperature so that a strengthening layer 13 is formed all over the exposed surfaces of the glass substrate 1 (FIG. 1B). Then, the top and bottom surfaces 11 and 12 of the glass substrate 1 are polished to a depth greater than the thickness of the strengthening layer 13 so that the strengthening layer formed on the top and bottom surfaces 11 and 12 of the glass substrate 1 is removed (FIG. 1C). Here, the polishing depth is preferably in the range of from about twice to about ten times the thickness of the strengthening layer. Polishing may be performed by any conventionally known method, for example, by polishing using a brush or polishing using a polishing substance. Examples of polishing substances include, among others, cerium oxide, chromium oxide, zirconium oxide, and titanium oxide.

A glass substrate according to the present invention may contain any ingredients. However, for stable formation of a strengthening layer with an appropriate thickness, and for still higher mechanical strength and chemical durability, it is preferable that a glass substrate according to the invention contain the following glass ingredients at a recording surface thereof: 40 to 75% by weight of $SiO_2$; 3 to 20% by weight of $Al_2O_3$; 0 to 8% by weight, zero inclusive, of $B_2O_3$; a total of 5 to 15% by weight of $R_2O$ compounds, where R=Li, Na, and K; $SiO_2$+$Al_2O_3$+$B_2O_3$ accounting for 60 to 90% by weight; a total of 0 to 20% by weight, zero inclusive, of R'O compounds, where R'=Mg, Ca, Sr, Ba, and Zn; and a total of 0 to 15% by weight, zero inclusive, of $TiO_2$+$ZrO_2$+$Ln_xO_y$, where $Ln_xO_y$ represents at least one compound selected from the group consisting of lanthanoid metal oxides, $Y_2O_3$, $Nb_2O_5$, and $Ta_2O_5$, with the following condition fulfilled:

$$1.5 < Al_2O_3/B_2O_3, \text{ or } B_2O_3 = 0\%.$$

Now, the grounds for setting these limitations on the ingredients will be explained.

First of all, $SiO_2$ is an ingredient that forms the matrix of glass. With a $SiO_2$ content less than 40%, the glass has an unstable structure. This not only degrades the chemical durability of the glass, but also degrades the melt viscosity properties thereof, making the glass difficult to mold. On the other hand, with a $SiO_2$ content higher than 75%, the glass shows low fusibility. This lowers productivity and makes it impossible to obtain sufficient rigidity. Hence, a preferred range of the $SiO_2$ content is from 40 to 75%. A further preferred range is from 50 to 72%.

$Al_2O_3$ gets into the matrix of glass, and serves to stabilize the structure of the glass and enhance the chemical durability thereof. With an $Al_2O_3$ content lower than 3%, the glass structure is not stabilized sufficiently, and ion exchange does not proceed stably in the strengthening process. On the other hand, with an $Al_2O_3$ content higher than 20%, the glass shows low fusibility, lowering productivity. Hence, a preferred range of the $Al_2O_3$ content is from 3 to 20%. A further preferred range is from 5 to 18%.

$B_2O_3$ improves the fusibility of glass and thereby enhances productivity. In addition, it gets into the matrix of the glass, and serves to stabilize the structure of the glass and enhance the chemical durability thereof. With a $B_2O_3$ content higher than 8%, the glass shows poor melt viscosity properties and is thus difficult to mold. Moreover, the glass melt shows high volatility. These factors greatly lower productivity and stability. Hence, a preferred range of the $B_2O_3$ content is 8% or lower (zero inclusive). A further preferred range is 6% or lower.

If the total content of these three glass ingredients ($SiO_2$, $Al_2O_3$, and $B_2O_3$), which are the skeletal ingredients of glass, is less than 60%, the glass has a brittle structure. On the other hand, if their total content is higher than 90%, the glass shows low fusibility, lowering productivity. Hence, a preferred total content of those glass ingredients is from 60 to 90%. A further preferred range is from 68 to 88%.

Alkali metal oxides $R_2O$ (R=Li, Na, and K) improve the fusibility of glass, increasing productivity. With a total alkali metal oxide content lower than 5%, fusibility is not sufficiently improved, and the glass substrate cannot be strengthened sufficiently by the ion exchange process. On the other hand, with a total alkali metal oxide content higher than 15%, excess amounts of alkali metal oxides are dispersed throughout the skeleton of the glass, increasing alkali elution and greatly degrading chemical durability. Moreover, in the strengthening process, the ion exchange reaction proceeds excessively, making it difficult to control the thickness of the strengthened layer. Hence, a preferred range of the total alkali metal oxide content is from 5 to 15%. A further preferred range is from 7 to 16%. Moreover, to obtain a so-called mixed alkali effect, which helps reduce alkali elution, it is preferable that the lower limit of the content of each alkali metal oxide be 0.5%.

Divalent metal oxides R'O (R'=Mg, Ca, Sr, Ba, and Zn) increase the rigidity of glass, improve the fusibility thereof, and stabilize the structure thereof. With a total R'O content higher than 20%, the glass has an unstable structure, leading to lower melt productivity and lower chemical durability. Hence, a preferred R'O content is 20% or lower. A further preferred upper limit of the total R'O content is 18%. Preferred contents of the individual R'O ingredients are given below.

MgO increases the rigidity of glass and improves the fusibility thereof. With a MgO content higher than 20%, the glass may have an unstable structure, lowering the melt productivity and chemical durability of the glass. Hence, a preferred range of the MgO content is from 0 to 19%. A further preferred upper limit is 18%.

CaO increases the linear thermal expansion coefficient and rigidity of glass, and improves the fusibility thereof. With a CaO content higher than 10%, the glass may have an unstable structure, lowering the melt productivity and chemical durability of the glass. Hence, a preferred range of the MgO content is from 0 to 10%. A further preferred upper limit is 9%.

SrO increases the linear thermal expansion coefficient of glass, stabilizes the structure thereof, and improves the fusibility thereof. With a SrO content higher than 8%, the glass may have an unstable structure. Hence, a preferred range of the SrO content is from 0 to 8%. A further preferred upper limit is 6%.

BaO exerts the same effects as SrO. With a BaO content higher than 8%, the glass may have an unstable structure. Hence, a preferred range of the BaO content is from 0 to 8%. A further preferred upper limit is 6%.

ZnO increases the chemical durability and rigidity of glass, and improves the fusibility thereof. With a ZnO content higher than 6%, the glass may have an unstable structure, lowering the melt productivity and chemical durability of the glass. Hence, a preferred range of the ZnO content is from 0 to 6%. A further preferred upper limit is 5%.

$TiO_2$ strengthens the structure of glass, enhances the rigidity thereof, and improves the fusibility thereof. $ZrO_2$ strengthens the structure of glass, enhances the rigidity thereof, and enhances the chemical durability thereof. $Ln_xO_y$ strengthens the structure of glass, and enhances the rigidity and toughness thereof. Here, $Ln_xO_y$ represents at least one compound selected from the group consisting of lanthanoid metal oxides, $Y_2O_3$, $Nb_2O_5$, and $Ta_2O_5$. Lanthanoid metal oxides include different types of compounds of composition $Ln_2O_3$, LnO, and the like, and examples of Ln include La, Ce, Er, Pr, Nd, Pm, Sm Eu, Gd, Tb, Dy, Ho, Tm, Yb, and Lu. With a total content of $TiO_2+ZrO_2+Ln_xO_y$ higher than 15%, the glass may be unstable, with greatly reduced toughness and a higher tendency to devitrification, leading to extremely low productivity. Hence, a preferred range of the total content of these glass ingredients is 15% or lower. A further preferred range of their total content is from 0.5 to 13%.

In the glass composition used in the present invention, when the $B_2O_3$ content is not zero, $Al_2O_3/B_2O_3$ needs to be more than 1.5. With $Al_2O_3/B_2O_3$ equal to or less than 1.5, the glass has a brittle structure, and does not exhibit satisfactory toughness. Moreover, in the strengthening process, ion exchange does not proceed stably.

To the glass ingredients according to the invention, 2% or less of a clarifier such as $Sb_2O_3$ may also be added. As required, any other conventionally known glass ingredient or additive may be added so long as it does not spoil the effects achieved by the present invention.

From the glass ingredients described above, a glass substrate according to the invention may be produced by any conventionally known fabrication process, for example in the following manner. Raw materials of glass ingredients, i.e., oxides, carbonates, nitrates, hydroxides, and the like corresponding to the individual ingredients, are, in the desired proportions and in the form of powder, fully mixed to obtain a blending of the raw materials. This blending is then put, for example, in a platinum crucible placed inside an electric furnace heated to 1 300 to 1 550° C., where the blending is first melted and clarified and then stirred and homogenized. The molten glass is then poured into a preheated mold, and is cooled slowly so as to be formed into a glass block. Next, the glass block is heated again to close to its glass transition point and is then cooled slowly so as to be straightened. The glass block thus obtained is then sliced into a disk, out of which a glass substrate is cut out using a core drill so as to have concentric outer and inner edges. Alternatively, the molten glass is formed into a disk by press molding.

It is preferable that a glass substrate according to the invention fulfill the following properties. First, it is preferable that a glass substrate according to the invention have a specific elastic modulus E/ρ of 30 or higher. With a glass substrate that is not treated by strengthening, its mechanical strength depends on its rigidity. Thus, with a specific elastic modulus lower than 30, the substrate has insufficient mechanical strength so that, when it receives impact from outside while being mounted in a hard disk drive, it is prone to breakage at where it is fastened to a hard disk drive member. A further preferred specific elastic modulus E/ρ is 31 or higher.

It is preferable that a glass substrate according to the invention have a Vickers hardness Hv in the range of from 450 to 650. With a Vickers hardness lower than 450, the substrate is prone to breakage resulting from impact and to damage in the fabrication process. On the other hand, a Vickers hardness higher than 650 lowers the rate at which the glass substrate can be polished in the polishing process, makes it difficult to obtain a surface with the desired flatness, and makes it difficult to adjust the surface shape of the substrate by tape texture polishing, or correct surface defects by scrub washing, or perform other treatment after the polishing process. The Vickers hardness of the substrate can be controlled within that range, for example, by adjusting, so long as the desired main properties are not degraded, the proportions of the ingredients in such a way as to increase the ion fill factor. A further preferred lower limit of the Vickers hardness Hv is 500, and a further preferred upper limit thereof is 630.

It is preferable that a glass substrate according to the invention have alkali elution A of 350 ppb or lower per 2.5-inch disk. With alkali elution A higher than 350 ppb, when the glass substrate is used in an information recording medium, the recording film such as a magnetic film that is formed on the surface of the glass substrate is degraded by elution of the alkali ingredients from the substrate. Further preferable alkali elution A is 320 ppb or lower.

It is preferable that a glass substrate according to the invention have Si elution S of 500 ppb or lower per 2.5-inch disk. Since $SiO_2$ is the main ingredient of the glass skeleton, the Si elution S serves as an indicator of the watertightness of the glass substrate, i.e., its stability against water. With Si elution S higher than 500 ppb, the glass substrate is not sufficiently watertight. This lowers production stability in the polishing and clearing process in the fabrication process, and makes the glass substrate susceptible to the influence of moisture present in the air, leading to lower storage stability. A further preferred range of the Si elution S is 400 ppb or lower per 2.5-inch disk.

It is preferable that a glass substrate according to the invention have a fracture toughness Kc higher than 0.80. With a fracture toughness Kc of 0.80 or lower, when the glass substrate is used in an information recording medium, a crack may develop in the glass substrate when pressure or the like is applied thereto in the process of forming a recording film such as a magnetic film on the surface thereof. Moreover, with a fracture toughness Kc of 0.80 or lower, the substrate is prone to damage when it is machined, leading to a low machining yield. A further preferred range of the fracture toughness Kc is 0.85 or higher.

A glass substrate according to the invention can be used to produce disks of any diameter, for example 3.5-inch, 2.5-inch, 1.8-inch, and any smaller-diameter disks, with any thickness, for example 2 mm thick, 1 mm thick, 0.63 mm thick, and any slimmer disks.

Next, an information recording medium employing a glass substrate according to the present invention will be described. When employed as a substrate of an information recording medium, a glass substrate according to the invention contributes to durability and high recording density. Now, such an information recording medium will be described with reference to the drawing.

Figure 2:
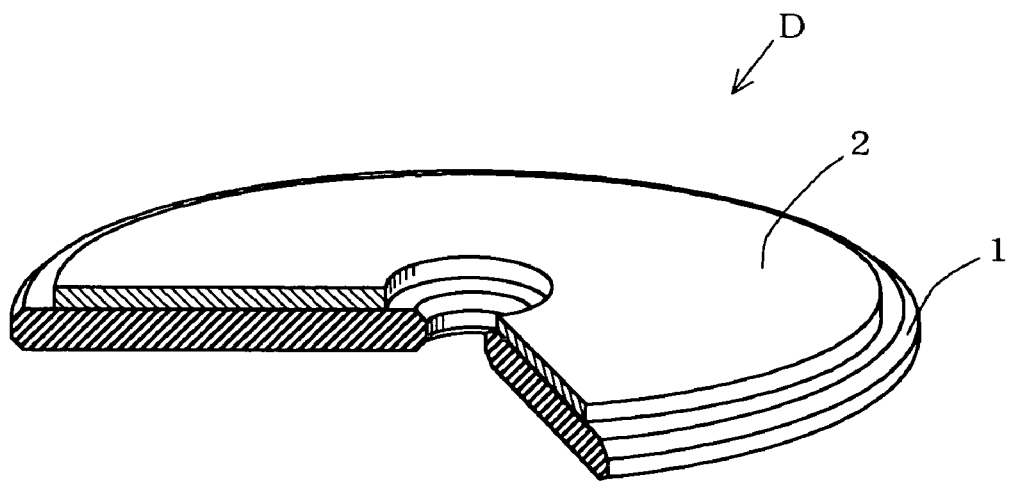
FIG. 2 is a perspective view showing an example of an information recording medium according to the invention.
Figure 3:
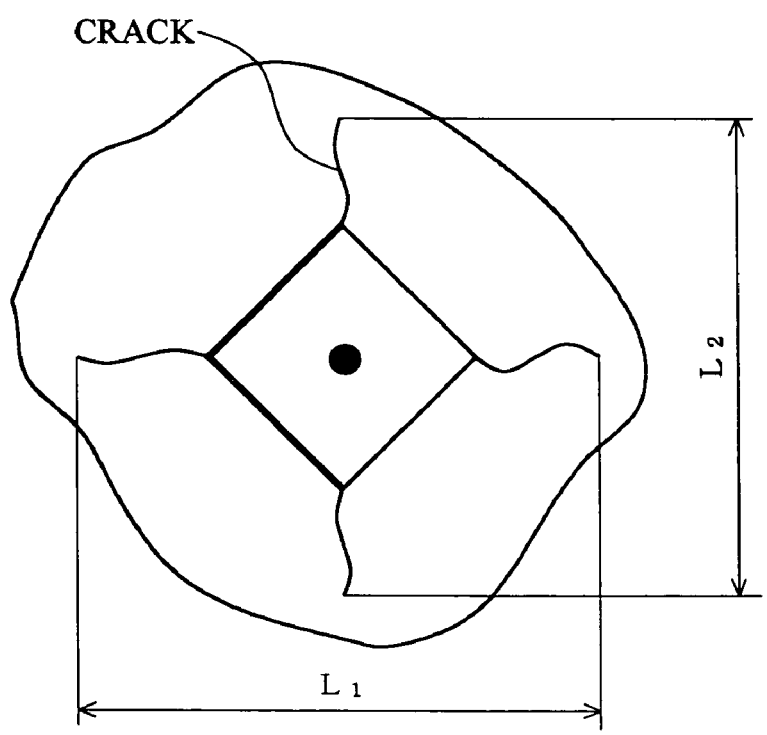
FIG. 3 is a diagram schematically showing a pressure mark and cracks produced when a pressure is applied to the surface of a glass substrate with a Vickers indenter.

FIG. 2 is a perspective view of a magnetic disk. This magnetic disk D is composed of a circular glass substrate 1 and a magnetic film 2 formed directly on a surface thereof. The magnetic film 2 may be formed by any conventionally known method. For example, it is formed by spin-coating the substrate with a thermosetting resin having magnetic particles dispersed therein, or by sputtering, or by electroless plating. Spin-coating provides a film thickness of about 0.3 to 1.2 μm, sputtering provides a film thickness of about 0.04 to 0.08 μm, and electroless plating provides a film thickness of about 0.05 to 0.1 μm. To minimize the film thickness and maximize the density, it is preferable to form the magnetic film 2 by sputtering or electroless plating.

The magnetic film may be formed out of any conventionally known magnetic material, of which a preferred example is a Co-based alloy that contains Co, which exhibits high crystal anisotropy, as its main ingredient so as to have high coercivity and that has Ni and Cr added thereto to adjust remanent magnetic flux density. Specifically, examples of such alloys containing Co as their main ingredient include CoPt, CoCr, CoNi, CoNiCr, CoCrTa, CoPtCr, CoNiPt, CoNiCrPt, CoNiCrTa, CoCrPtTa, CoCrPtB, and CoCrPtSiO. The magnetic film may be divided into a plurality of layers with one or more non-magnetic films (for example, Cr, CrMo, or CrV) laid in between so as to form a multilayer structure (for example, CoPtCr/CrMo/CoPtCr, or CoCrPtTa/CrMo/CoCrPtTa) with a view to reducing noise. Instead of the magnetic materials mentioned above, it is also possible to use a magnetic material of a granular type having magnetic particles of Fe, Co, FeCo, CoNiPt, or the like dispersed in a non-magnetic film of a ferrite-based material, an iron/rare earth-based material, $SiO_2$, BN, or the like. The magnetic film may be for either surface recording or vertical recording.

To ensure smooth sliding of a magnetic head, the magnetic film may be coated with a thin layer of lubricant on the surface. An example of the lubricant is perfluoro polyether (PFPE), a liquid lubricant, diluted with a CFC-based solvent.

As required, a primer or protective layer may additionally be formed. In a magnetic disk, the material of the primer layer is selected according to the magnetic film. The primer layer is formed out of, for example, one or more selected from non-magnetic metals such as Cr, Mo, Ta, Ti, W, V, B, Al, and Ni. With a magnetic film containing Co as its main ingredient, Cr used singly or a Cr alloy is preferred for better magnetic properties and out of other considerations. The primer layer may be composed of a single layer, or may be composed of a plurality of layers of identical or different types laid over one another to form a multilayer primer layer such as Cr/Cr, Cr/CrMo, Cr/CrV, NiAl/Cr, NiAl/CrMo, or NiAl/CrV.

The protective layer for preventing wear and corrosion of the magnetic film may be a layer of Cr, Cr alloy, carbon, hydrogenated carbon, zirconia, silica, or the like. Such a protective layer can be formed in continuous steps with the primer layer, the magnetic film, and the like using an in-line-type sputtering machine. The protective layer may be composed of a single layer, or may be composed of a plurality of layers of identical or different types laid over one another to form a multilayer protective layer. It is also possible to form, on top of or instead of the protective layer described above, another protective layer. For example, instead of the protective layer described above, a layer of silicon oxide ($SiO_2$) may be formed by applying, on top of a Cr layer, and then burning fine particles of colloidal silica dispersed in tetraalkoxysilane diluted with an alcohol-based solvent.

A magnetic disk has been described above as an example of an information recording medium according to the invention. It is to be understood, however, that a glass substrate according to the invention applies not only to this type of information recording medium but also to magneto-optical disks, optical disks, and the like.

EXAMPLES

Practical Examples 1 to 9 and Comparative Examples 1 to 4

For each of different glass compositions, which each correspond to one of Practical Examples 1 to 9 and Comparative Examples 1 to 4, prescribed amounts of glass ingredients in the form of powder were weighed and put in a platinum crucible, were mixed, and then were melted at 1 550° C. in an electric furnace. When the ingredients were melted sufficiently, stirring blades were put into the molten glass to stir it for about one hour. Thereafter, the stirring blades were taken out, then the molten glass was allowed to stand for 30 minutes, and then it was poured into a mold so as to be formed into a glass block. The glass block was then heated again to close to its glass transition point, and was then cooled slowly so as to be straightened. The glass block thus obtained was then sliced into a disk having a thickness of 0.635 mm, out of which a glass substrate was cut out using a cutter so as to have concentric inner and outer edges (with an inner diameter of 20 mm and an outer diameter of 65 mm).

The glass substrate thus produced was then immersed for 0.5 hours in melt of a mixture of 70 mol % of $NaNO_3$ and 30 mol % of $KNO_3$ heated to 350° C. so that a strengthened layer was formed all over the exposed surfaces of the glass substrate. Then, the top and bottom surfaces of the glass substrate were coarse- and fine-polished with cerium oxide to remove a depth of 100 μm in total. Then, the glass substrate was cleaned to obtain the glass substrate of one of Practical Examples 1 to 9 and Comparative Examples 1 to 3. With the glass substrate of Comparative Example 4, the top and bottom surfaces thereof were polished to remove a depth of 20 μm in total. With each of the glass substrates thus produced, its properties were evaluated in the manners described earlier and below. The composition of the glass substrate of each example and the results obtained therewith are shown in Table 1.

Thickness of the Strengthened Layer

The outer and inner edge surfaces and the recording surface of the glass substrate after the polishing process were inspected under a polarizing microscope to measure the thickness of the strengthened layer.

Annular Strength Ratio

Figure 4:
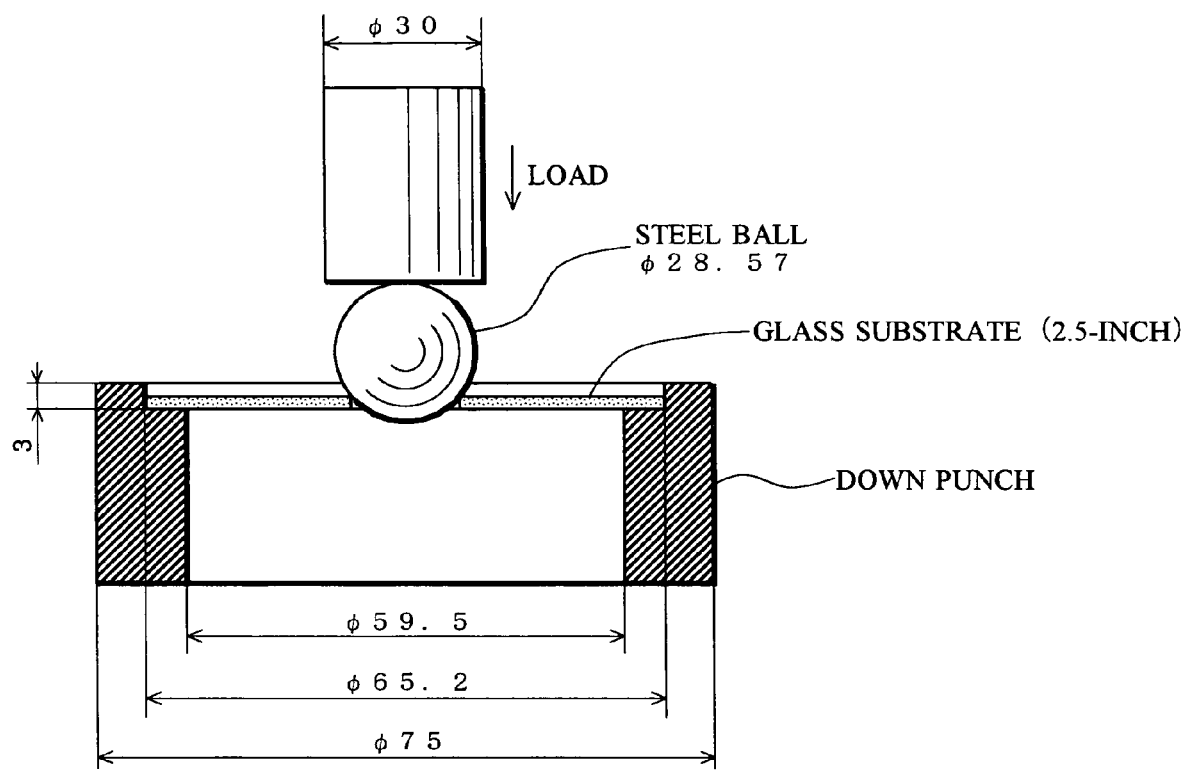
FIG. 4 is a diagram illustrating an outline of annular bending strength testing.

Using an apparatus as shown in FIG. 4, annular bending strength testing was performed on the glass substrate. Specifically, a load was applied to the glass substrate by way of a steel ball, and the load at the moment when the glass substrate was destroyed was measured as the destruction load. This annular bending strength testing was performed once with chemical strengthening and once without chemical strengthening, and the ratio of the strength (destruction load) F with chemical strengthening to that without chemical strengthening, namely $F_{with\ chemical\ strengthening}/F_{without\ chemical\ strengthening}$, was calculated.

Flatness

Using a disk shape tester, the model WYKO 400G manufactured by Veeco Instruments, the flatness of the glass substrate was measured.

Table 1 clearly shows the following. The glass substrates of Practical Examples 1 to 9 had an annular strength ratio of 1.5 or higher, a 50% or higher improvement as compared with when no chemical strengthening was performed. In addition, these glass substrates had a flatness of 3 μm or lower, satisfactory for use in an information recording medium.

On the other hand, with the glass substrate of Comparative Example 1, of which the alkali metal oxide content was high, in the chemical strengthening process, the ion exchange reaction proceeded excessively, with the result that the strengthened layer had a thickness as great as 120 μm, with 70 μm thereof left on the recording surface even after the polishing process. This led to alkali elution as high as 623 ppb and a flatness as high as 33 μm, making the glass substrate unfit for use in an information recording medium. With the glass substrate of Comparative Example 2, of which the value of $Al_2O_3/B_2O_3$ was as small as 1.3, in the chemical strengthening process, the ion exchange reaction did not proceed stably, and thus no strengthening layer was formed. Accordingly, the glass substrate did not have increased strength. Moreover, the glass substrate had a brittle structure, and had Si elution as high as 709 ppb. With the glass substrate of Comparative Example 3, of which the total alkali metal oxide content was as low as 4.0%, in the chemical strengthening process, no strengthening layer was formed. Moreover, the glass substrate had a Vickers hardness as high as 655, resulting in low workability, and had a fracture toughness as low as 0.78, resulting in low strength. Moreover, the glass substrate had Si elution as high as 563 ppb. The glass substrate of Comparative Example 4 had the same composition as that of Practical Example 5, but had 5 μm of the strengthened layer left on the recording surface as a result of limiting the grinding depth on the top and bottom surfaces to 20 μm in total (i.e., 10 μm on each side) in the polishing process. This glass substrate had a flatness as high as 15 μm even after polishing, and was thus unfit for use in an information recording medium.

Next, as the ingredients of the chemical strengthening melt and the temperature and duration of the chemical strengthening process were varied, the thickness of the strengthened layer formed on the glass substrate was measured. Here, the glass composition of Practical Example 1 was used. Thereafter, polishing was performed to a predetermined depth, and the annular strength ratio and flatness of the glass substrate under different conditions were measured. The results are shown in Table 2.

Table 2 shows the following. By varying the ratio of the ingredients of the nitrates used, and by varying the temperature and duration of the process, it is possible to control the thickness of the strengthened layer formed on the glass substrate. Moreover, by removing, by polishing, the strengthened layer formed on the recording surface so that the strengthened layer is left only on the outer and inner edge surfaces, it is possible to increase the annular bending strength by a factor of 1.5 to 2.3, and to reduce the flatness of the recording surface to 3 μm or less.

TABLE 1

|  |  | Practical Example |  |  |  |  |  |  |  |  | Comparative Example |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Glass Composition (% by Weight) | $SiO_2$ | 66.5 | 66.8 | 68.4 | 71.5 | 65.0 | 70.0 | 68.5 | 60.0 | 59.5 | 68.0 | 58.0 | 56.0 | 65.0 |
|  | $Al_2O_3$ | 12.3 | 9.3 | 9.5 | 10.0 | 12.0 | 13.0 | 12.5 | 15.0 | 14.5 | 13.0 | 14.0 | 16.0 | 12.0 |
|  | $B_2O_3$ | 2.4 | 5.4 | 5.5 |  | 2.2 | 2.5 | 2.5 | 1.0 | 1.1 |  | 11.0 | 5.0 | 2.2 |
|  | $SiO_2 + Al_2O_3 + B_2O_3$ | 81.2 | 81.5 | 83.4 | 81.5 | 79.2 | 85.5 | 83.5 | 76.0 | 75.1 | 81.0 | 83.0 | 77.0 | 79.2 |
|  | $Li_2O$ | 6.8 | 4.5 | 4.0 | 4.5 | 5.3 | 7.0 | 7.0 | 4.4 | 4.0 | 10.0 | 4.5 | 2.0 | 5.3 |
|  | $Na_2O$ | 3.5 | 5.0 | 4.5 | 5.0 | 5.9 | 3.5 | 3.6 | 1.5 | 2.9 | 7.0 | 7.5 | 2.0 | 5.9 |
|  | $K_2O$ | 1.8 | 2.5 | 2.2 | 2.5 | 3.0 | 2.0 | 1.8 | 1.7 | 2.2 |  | 2.0 |  | 3.0 |
|  | $Li_2O + Na_2O + K_2O$ | 12.1 | 12.0 | 10.7 | 12.0 | 14.2 | 12.5 | 12.4 | 7.6 | 9.1 | 17.0 | 14.0 | 4.0 | 14.2 |
|  | MgO |  |  |  |  |  |  |  | 2.0 | 7.5 | 5.7 |  | 8.7 |  |
|  | CaO |  |  |  |  |  |  |  |  | 1.0 |  |  | 2.0 |  |
|  | SrO |  |  |  |  |  |  |  |  | 1.0 |  |  | 2.0 |  |
|  | BaO |  |  |  |  |  |  |  |  | 1.0 |  |  |  |  |
|  | ZnO |  |  |  |  |  |  |  | 3.0 | 3.0 |  |  |  |  |
|  | $TiO_2$ | 2.0 | 1.9 | 1.7 | 2.0 | 2.0 | 2.0 | 2.0 | 2.4 | 1.5 |  |  | 3.6 | 2.0 |
|  | $ZrO_2$ | 2.0 | 1.9 | 1.7 | 2.0 | 2.0 |  |  |  | 1.0 | 2.0 |  | 1.0 | 2.0 |
|  | $La_2O_3$ | 2.4 | 2.4 |  |  | 2.4 |  |  |  | 1.2 |  | 4.0 | 1.4 | 2.4 |
|  | $Gd_2O_3$ |  |  | 2.2 |  |  |  |  |  |  |  |  |  |  |
|  | $Y_2O_3$ |  |  |  | 2.2 |  |  |  |  |  |  |  |  |  |
|  | $Nb_2O_5$ |  |  |  |  |  |  |  |  | 3.0 |  |  |  |  |
|  | $Sb_2O_3$ | 0.3 | 0.3 | 0.3 | 0.3 | 0.2 |  | 0.1 | 0.5 | 0.4 |  |  | 0.3 | 0.2 |
| Ingredient Ratio | $Al_2O_3/B_2O_3$ | 5.1 | 1.7 | 1.7 | — | 5.5 | 5.2 | 5.0 | 15.0 | 13.2 | — | 1.3 | 3.2 | 5.5 |
| Substrate Properties | Specific Elastic Modulus (E/ρ) | 33.7 | 32.9 | 32.9 | 32.3 | 32.7 | 33.9 | 34.1 | 34.5 | 34.1 | 31.0 | 32.9 | 35.0 | 32.7 |
|  | Vickers Hardness Hv | 570 | 590 | 570 | 555 | 570 | 560 | 570 | 620 | 640 | 545 | 590 | 655 | 580 |
|  | Fracture Toughness Kc | 1.11 | 1.02 | 1.15 | 1.18 | 0.99 | 1.20 | 1.21 | 0.97 | 0.91 | 2.79 | 0.85 | 0.78 | 1.22 |
|  | Alkali Elution A (ppb) | 181 | 107 | 122 | 285 | 272 | 160 | 78 | 43 | 58 | 623 | 250 | 35 | 254 |
|  | $SiO_2$ Elution S (ppb) | 260 | 135 | 242 | 269 | 224 | 65 | 40 | 144 | 392 | 388 | 709 | 563 | 198 |
| Strengthening Conditions |  | A | A | A | A | A | A | A | A | A | A | A | A | A |
| Polishing Depth | μm, Top and Bottom Surfaces in Total | 100 | 100 | 100 | 100 | 100 | 100 | 100 | 100 | 100 | 100 | 100 | 100 | 20 |
| Strengthened Layer Thickness | Outer and Inner Edge Surfaces (μm) | 10 | 10 | 10 | 10 | 15 | 10 | 10 | 6 | 7 | 120 | No | No | 15 |
|  | Recording Surface (μm) | No | No | No | No | No | No | No | No | No | 70 | No | No | 5 |
| Annular Strength Ratio | With/Without Chemical Strengthening | 1.6 | 1.5 | 1.5 | 1.8 | 2.1 | 1.8 | 1.8 | 1.5 | 1.6 | 2.8 | 1.0 | 0.9 | 2.1 |
| Flatness After Polishing | μm | 2 | 1 | 1 | 1 | 2 | 2 | 3 | 0 | 2 | 33 | 2 | 2 | 15 |

TABLE 2

| Strengthening Condition No. | Nitrate Melt Ingredients | | | Process Conditions | | Polishing Strengthened Layer Thickness (μm) | Depth μm/Both Sides in Total | Strengthened Layer Thickness (μm) | | Chemical Strengthening Results | |
|---|---|---|---|---|---|---|---|---|---|---|---|
| | LiNO$_3$ (mol %) | NaNO$_3$ (mol %) | KNO$_3$ (mol %) | Temp. °C. | Duration h | Thickness (μm) | | Outer/Inner Edge Surface | Recording Surface | Annular Bending Strength Ratio With/Without Strengthening | Flatness After Polising μm |
| A | 0 | 70 | 30 | 350 | 0.5 | 10 | 100 | 10 | NO | 1.6 | 2 |
| B | 0 | 70 | 30 | 350 | 1 | 10 | 100 | 10 | NO | 1.8 | 2 |
| C | 0 | 70 | 30 | 350 | 3 | 15 | 100 | 15 | NO | 1.8 | 2 |
| D | 0 | 70 | 30 | 330 | 0.5 | 10 | 100 | 10 | NO | 1.8 | 1 |
| E | 0 | 70 | 30 | 380 | 0.5 | 10 | 100 | 10 | NO | 1.8 | 3 |
| F | 0 | 70 | 30 | 410 | 0.5 | 15 | 100 | 15 | NO | 1.8 | 3 |
| G | 10 | 70 | 20 | 350 | 0.5 | 8 | 100 | 8 | NO | 1.5 | 2 |
| H | 0 | 90 | 10 | 350 | 3 | 10 | 100 | 10 | NO | 1.9 | 3 |
| I | 0 | 50 | 50 | 350 | 0.5 | 10 | 100 | 10 | NO | 2.1 | 2 |
| J | 0 | 30 | 70 | 350 | 0.5 | 15 | 100 | 15 | NO | 2.3 | 1 |
| K | 0 | 10 | 90 | 400 | 0.5 | 20 | 100 | 20 | NO | 2.0 | 2 |
| L | 0 | 0 | 100 | 400 | 1 | 20 | 100 | 20 | NO | 2.3 | 3 |

What is claimed is:

1. A chemically strengthened glass substrate for an information recording medium, wherein a strengthened layer formed by chemical strengthening exists on an outer edge surface and on an inner edge surface but substantially not on a surface on which an information recording layer is formed,
wherein, on the surface on which the information recording layer is formed, the glass substrate comprises the following glass ingredients:
60 to 75% by weight of SiO$_2$;
3 to 20% by weight of Al$_2$O$_3$;
0 to 8% by weight, zero inclusive, of B$_2$O$_3$;
a total of 5 to 15% by weight of R$_2$O compounds, where R = Li, Na, and K;
SiO$_2$+Al$_2$O$_3$ accounting for 63 to 90% by weight;
a total of 0 to 20% by weight, zero inclusive, of R'O compounds, where R'=Mg, Ca, Sr, Ba, and Zn; and
a total of 0 to 15% by weight, zero inclusive, of TiO$_2$+ZrO$_2$+Ln$_x$O$_y$, where Ln$_x$O$_y$ represents at least one compound selected from the group consisting of lanthanoid metal oxides, Y$_2$O$_3$, Nb$_2$O$_5$, and Ta$_2$O$_5$, and
wherein the following condition is fulfilled:

1.5<Al$_2$O$_3$/B$_2$O$_3$, or B$_2$O$_3$=0%.

2. A glass substrate for an information recording medium as claimed in claim 1,
wherein the glass substrate has a specific elastic modulus E/ρ of 30 or higher.

3. A glass substrate for an information recording medium as claimed in claim 1,
wherein the glass substrate has a Vickers hardness Hv in a range of from 450 to 650.

4. A glass substrate for an information recording medium as claimed in claim 1,
wherein the glass substrate has alkali elution A of 350 ppb or lower per 2.5-inch disk.

5. A glass substrate for an information recording medium as claimed in claim 1,
wherein the glass substrate has Si elution S of 500 ppb or lower per 2.5-inch disk.

6. A glass substrate for an information recording medium as claimed in claim 1,
wherein the glass substrate has a fracture toughness Kc of 0.80 MPa/m$^{1/2}$ or greater.

7. An information recording medium comprising:
a glass substrate as claimed in claim 1; and
an information recording layer formed on at least one side surface of the glass substrate.

8. An information recording medium as claimed in claim 7,
wherein the glass substrate has a specific elastic modulus E/ρ of 30 or higher.

9. An information recording medium as claimed in claim 7,
wherein the glass substrate has a Vickers hardness Hv in a range of from 450 to 650.

10. An information recording medium as claimed in claim 7,
wherein the glass substrate has alkali elution A of 350 ppb or lower per 2.5-inch disk.

11. An information recording medium as claimed in claim 7,
wherein the glass substrate has Si elution S of 500 ppb or lower per 2.5-inch disk.

12. An information recording medium as claimed in claim 7,
wherein the glass substrate has a fracture toughness Kc of 0.80 MPa/m$^{1/2}$ or greater.

13. A chemically strengthened glass substrate as claimed in claim 1, wherein a lower limit of the content of K$_2$O is 0.5% by weight.

14. A chemically strengthened glass substrate as claimed in claim 1 wherein a lower limit of the content of B$_2$O$_3$ is 1.0% by weight.

15. A chemically strengthened glass substrate as claimed in claim 1, wherein the content of TiO$_2$+ZrO$_2$+Ln$_x$O$_y$ is a total of 0.5% to 13% by weight.

* * * * *

UNITED STATES PATENT AND TRADEMARK OFFICE
CERTIFICATE OF CORRECTION

PATENT NO.       : 7,566,673 B2
APPLICATION NO.  : 10/784447
DATED            : July 28, 2009
INVENTOR(S)      : Hideki Kawai It is certified that error appears in the above-identified patent and that said Letters Patent is hereby corrected as shown below:

Column 13:
Line 36, delete "$SiO_2 + Al_2O_3$" and insert -- $SiO_2 + Al_2O_3 + B_2O_3$ --.

Signed and Sealed this

Twenty-seventh Day of October, 2009

David J. Kappos
*Director of the United States Patent and Trademark Office*